United States Patent

Depoorter et al.

[15] 3,660,085
[45] May 2, 1972

[54] SPECTRAL SENSITIZATION OF PHOTOCONDUCTIVE COMPOSITIONS WITH PYRROL OR INDOLIZINYL CYANINE DYES

[72] Inventors: Henri Depoorter, Mortsel; Guy Alfred Rillaers, Kontich; Karel Eugeen Verhille, Mortsel; Theofiel Hubert Ghys, Kontich, all of Belgium

[73] Assignee: Gevaert-AGFA N.V., Mortsel, Belgium

[22] Filed: Dec. 2, 1969

[21] Appl. No.: 881,597

[30] Foreign Application Priority Data

Dec. 16, 1968  Great Britain.....................59,804/68

[52] U.S. Cl...................................................96/1.7, 96/1.6
[51] Int. Cl. .........................................................G03g 5/08
[58] Field of Search......................96/1.6, 1.7, 102, 105, 106; 260/240

[56] References Cited

UNITED STATES PATENTS

| | | | |
|---|---|---|---|
| 2,466,523 | 4/1949 | White et al. | 260/240 |
| 2,503,775 | 4/1950 | Sprague | 260/240 |
| 2,882,160 | 4/1959 | Stevens | 96/105 |
| 3,468,661 | 9/1969 | Libeer et al. | 96/1.7 |
| 3,507,692 | 4/1970 | Ghys et al. | 117/201 |
| 3,560,208 | 2/1971 | Funna, Jr. | 96/1.6 |

FOREIGN PATENTS OR APPLICATIONS 885,717   12/1961   Great Britain...........................96/1.7

Primary Examiner—George F. Lesmes
Assistant Examiner—John C. Cooper, IV
Attorney—Brufsky, Staas, Breiner & Halsey

[57] ABSTRACT

An inorganic recording material is described comprising a photoconductive substance, the light-sensitivity of which is increased by a monomethine, trimethine or pentamethine dye salt or betaine dye wherein the methine group or chain is terminated at each end either by 1H-pyrrol-2-yl or 1H-pyrrol-3-yl groups including such groups with fused aromatic rings or by 1- or 3-indolizinyl groups including substituted indolizinyl groups and wherein, the case of terminating pyrrole nuclei the said dyes contain in their molecule at least one carboxylic acid or sulphonic acid group in acid or salt form when both nitrogen atoms of the heterocyclic pyrrole nuclei carry substituents. The recording material has good spectral sensitizing effects in an aqueous as well as in an organic medium and has a high fastness to light.

10 Claims, No Drawings

SPECTRAL SENSITIZATION OF PHOTOCONDUCTIVE COMPOSITIONS WITH PYRROL OR INDOLIZINYL CYANINE DYES

The present invention relates to the spectral sensitization of photoconductive compositions, to such spectrally sensitized compositions, and to recording materials prepared therewith.

Photoconductive coatings containing a finely divided photoconductive substance e.g. photoconductive zinc oxide dispersed in a binder, are well known.

As described in U.S. Pat. No. 3,128,179 photoconductive zinc oxide can be sensitized with various organic dyes, e.g. Rose Bengal. A particular class of sensitizing agents proposed in this patent includes dyes known in the art of simple cyanine dyes, carbocyanine dyes and dicarbocyanine dyes comprising at least one carboxy group.

The dyes proposed in the above patent can be used for the spectral sensitization of photoconductive zinc oxide coated on a support from a homogeneous dispersion in a solution of an insulating binder in water or in an organic solvent. In practice, however, they are only of very limited use because of their low fastness to light.

It has now been found that monomethine, trimethine or pentamethine dye salts or betaine dyes wherein the methine group or chain is terminated at each end:

either by 1H-pyrrol-2-yl or 1H-pyrrol-3-yl groups, including such groups with fused aromatic rings, such as 1H-indol-2-yl or 1H-indol-3-yl groups, 3-isoindolyl groups, and such groups carrying further substituents, or by 1- or 3-indolizinyl groups including substituted 1- or 3-indolizinyl groups, and wherein in the first type of dyes i.e. when the terminating nuclei are 1H-pyrrol-2-yl or 1H-pyrrol-3-yl groups, the molecule comprises at least one carboxylic acid or sulphonic acid group when both nitrogen atoms of the said pyrrolyl nuclei carry substituents, are spectral sensitizing agents for photoconductive substances such as photoconductive zinc oxide, which are characterized by favorable spectral sensitizing effects in aqueous as well as in organic medium and have a high fastness to light.

The methine dye salts or betaine dyes of use according to the present invention can be represented by one of the following general formulas I to IV:

A. Dyes containing terminating pyrrolyl groups

I.

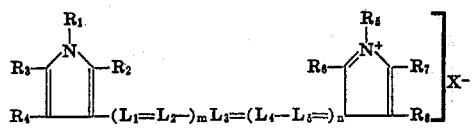

II.

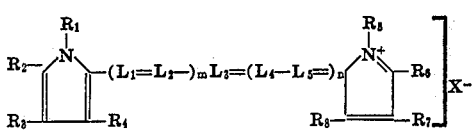

wherein:
each of $L_1$–$L_5$ (the same or different) stands for a methine group, an alkyl methine group of an aryl methine group, each of $n$ and $m$ (the same or different) stands for 0 or 1, each of $R_1$–$R_8$ (the same or different) stands for hydrogen, alkyl including substituted alkyl, preferably comprising at most four carbon atoms, allyl, cycloalkyl including substituted cycloalkyl, aralkyl including substituted aralkyl or aryl including substituted aryl, or $R_3$ together with $R_4$ and $R_7$ together with $R_8$ represent the atoms necessary to close a fused-on aromatic ring such as benzene, and $X^-$ represents an anion such as a chloride ion, a bromide ion, a iodide ion, a perchlorate ion, a benzene sulphonate ion, a p-toluenesulphonate ion, a methylsulphate ion, an ethylsulphate ion, a propylsulphate ion, but $X^-$ is not present when the molecule itself contains an anionic group, which may be for example a carboxylic or sulphonic acid group, and wherein the dyestuff contains in its molecule at least one sulphonic acid or carboxylic acid group when neither $R_1$ nor $R_5$ are hydrogen, the said sulphonic acid or carboxylic acid group being for example one of the R's standing for sulphophenyl or carboxyphenyl.

B. Dyes containing terminating indolizinyl groups

III.

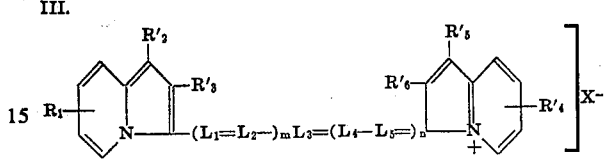

IV.

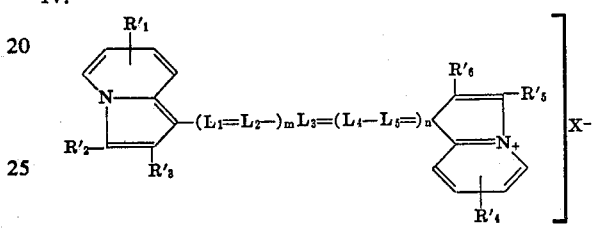

wherein:
each of $n$, $m$, $L_1$–$L_5$ and $X^-$ have the significances as set forth above, and each of $R'_1$–$R'_6$ (the same or different) stands for hydrogen, alkyl including substituted alkyl, preferably comprising at most four C-atoms, allyl, cycloalkyl including substituted cyclo-alkyl, aralkyl including substituted aralkyl or aryl including substituted aryl.

By appropriate choice of the substituents and methine chain length the characteristics of the sensitizers of the invention as regards sensitizing range, solubility, etc. can be adapted to the necessities.

Apart from having a favorable sensitizing action on photoconductive zinc oxide, the dyes corresponding to the above general formulas with a trimethine and pentamethine chain generally have their main absorption maximum lying in the far-red or infrared region of the spectrum and thus confer only a very low and neutral coloring to the photoconductive layer so that there can be dispensed with the use of additional dyes as otherwise frequently used together with sensitizing dyes having their main absorption in the visible region of the spectrum in order to compensate the undesirable coloring of the photoconductive layer by the said latter dyes (cf. United Kingdom Pat. No. 1,020,755). Indeed, in practice usually a mixture of at least two — most often more than two — dyes must be used for obtaining a high sensitivity when exposing a photoconductive layer to an illuminating source such as an ordinary light bulb and/or for obtaining a neutral tint of the photoconductive layer.

A photoconductive zinc oxide layer, when sensitized by dyes of use according to the present invention having their main absorption maximum beyond the visible region of the spectrum possesses a uniform sensitivity in the visible region of the spectrum and a high general sensitivity when exposed to an ordinary light bulb. Therefore, with suchlike dyes it suffices to add one single sensitizer to the photoconductive zinc oxide composition in order to obtain the desired sensivity where otherwise two or more spectral sensitizers are required to obtain the same effect.

The following is a non-limitative list of representative methine dyes according to the present invention.

1.

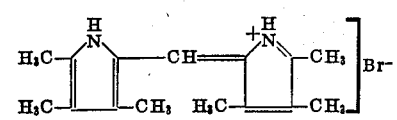

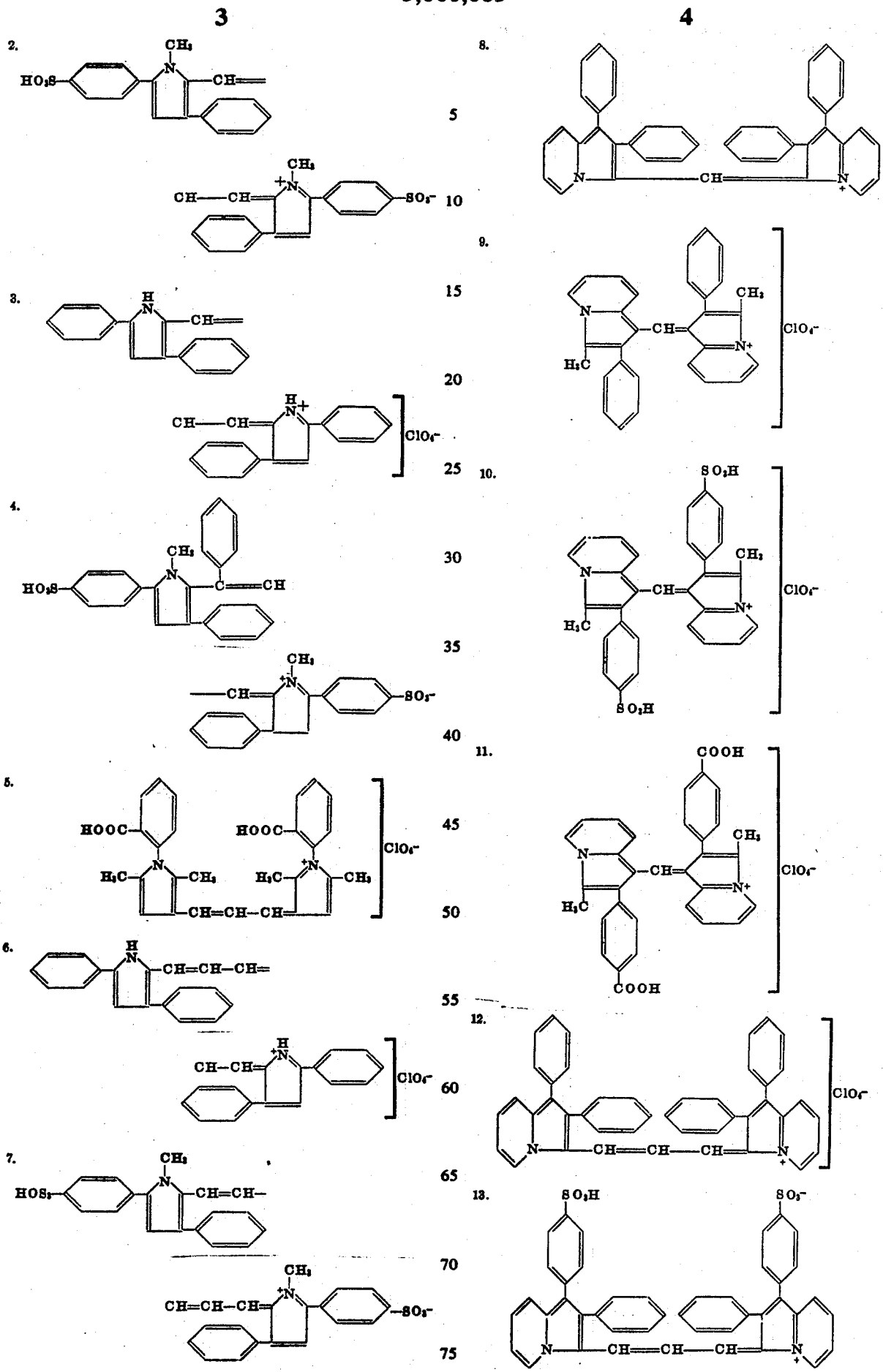

14.
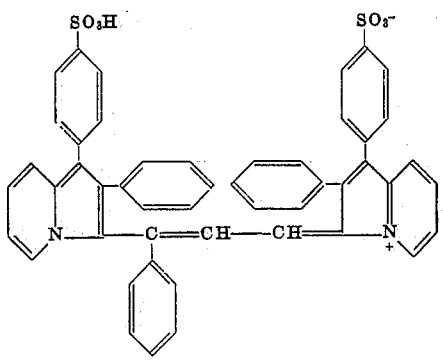

15.
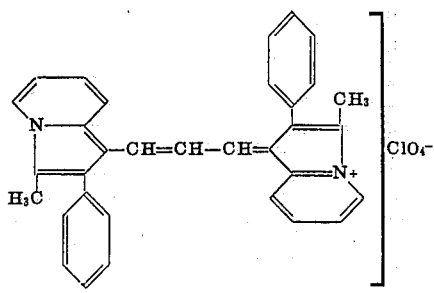

16.
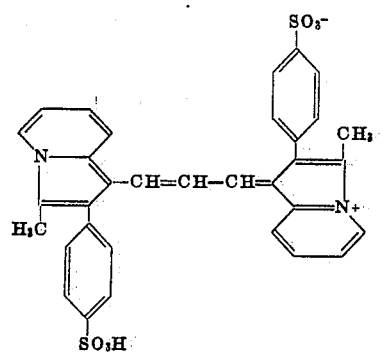

17.
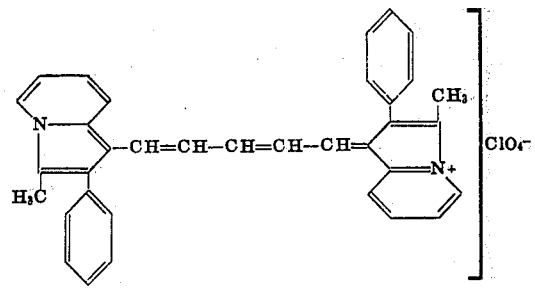

The dyes according to the present invention are well known or may be prepared by methods well known to those skilled in the art of polymethine dye synthesis. In this connection, the following references may be cited : J.Am.Chem.Soc. 64, 593 (1942); J.Gen.Chem. USSR 33, 2076 (1963) (English translation); Ann. 589, 207 (1954) and Ann. 592, 1 (1955); Ber. 87, 1011 (1954); Tetrahedron, 9, 106 (1960) and United Kingdom Pat. No. 781,000, 529,440, 691,694, 658,560, 696,646.

The methine dyes corresponding to one of the above general formulas are particularly useful for spectrally sensitizing inorganic photoconductive compounds e.g. photoconductive zinc oxide dispersed in a binder.

The sensitizing dyes used in the present invention can be allowed to adsorb to the inorganic photoconductive substance, preferably photoconductive zinc oxide, by adding them to a dispersion of that substance in an organic or aqueous medium either or not already containing the binder.

Zinc oxide recording layers applied from organic solvents and binding agents soluble in the organic medium are described e.g. in the Belgian Pat. Nos. 612,102 and 714,257.

Zinc oxide recording layers applied from an aqueous medium are described in the United Kingdom Pat. Nos. 1,125,579 and 1,125,580.

The spectral sensitizing agents are preferably added in dissolved state, e.g. dissolved in a water-miscible solvent or in water, to a dispersion of the photoconductive zinc oxide. When applied in an aqueous zinc oxide dispersion they are preferably incorporated into the recording layer from an organic liquid consisting of or containing a solvent, which has a very low vapor pressure and which is at least for 20 percent by weight soluble in water at 20° C. Such a method for sensitizing a photoconductive material is described in the United Kingdom Patent No. 1,154,613, which should be read in conjunction herewith.

Suitable dispersing agents for dispersing photoconductive zinc oxide in an aqueous medium are described in the French Pat. No. 1,540,020 which should also be read in conjunction herewith.

The optimum quantity of sensitizing agent per gram of photoconductive zinc oxide can be determined easily by a series of tests. A useful range is comprised between 0.01 mg and 2 mg per gram of photoconductive zinc oxide. The weight ratio of zinc oxide to binder may vary between relatively large limits. A ratio of 1 part by weight of photoconductive substance to 0.1 to 0.6 part by weight of total content of binder is preferred. Advantageously the coating mixture contains dispersed photoconductive zinc oxide in a weight ratio of 95 to 60 percent in respect of the total solids content of the coated and dried layer. The thickness of the photoconductive layer may be chosen between wide limits according to the requirements of each case. Good recording and reproduction results are attained with electrophotographic layers having a thickness of 1 to 20 μ, and preferably of 3 to 10 μ.

Preferably the sensitizing substances are used in combination with photoconductive zinc oxide prepared according to the French process.

The photoconductive recording layers containing a spectral sensitizing agent as above described may contain, in addition to the photoconductive substance(s) and the binder, spectral sensitizers of any other type (see e.g. United Kingdom Pat. No. 1,020,504), compounds increasing the dark-resistivity e.g. the phosphorus compounds described in the Belgian Pat. No. 612,102, and additives known in coating techniques e.g. pigments (see e.g. United Kingdom Pat. No. 1,007,349), compounds influencing the gloss and/or the viscosity, and compounds that counteract aging and/or oxidation of the layers, or which influence the thermal stability of the layers. When selecting any additives, preference is given to those which least reduce the dark-resistivity of the photoconductive layer.

The photoconductive composition sensitized according to the present invention may be coated on a support according to a known coating technique, e.g. by spraying, whirling, dip-coating, or by a coating technique wherein use is made of a doctor blade. The supports or base materials are chosen in view of the particular charging, exposure, recording, development and/or transfer technique wherein the recording material is used.

In electrophotographic recording techniques, wherein the photoconductive layer is electrostatically charged, the support preferably has an electric volume resistivity, which is considerably lower than that of the recording layer. Suitable supports are described e.g. in the United Kingdom Pat. No. 995,491, 1,020,503, and 1,020,504, and in the United States Pat. No. 3,008,825.

The photoconductive layer of an electrophotographic material, which is prepared starting from a coating composition according to the present invention, can be used for recording purposes, in which prior to exposure an electric charge is non-differentially applied according to known methods. However, the material can also be used in recording techniques, in which the exposure step precedes the charging step. For such a technique we may refer to e.g. the United Kingdom Pat. Nos. 1,033,419 and 1,033,420.

For comparison of the sensitivity of photoconductive recording elements, said elements are exposed in the same manner, e.g. through a step-wedge, and developed in the same conditions. Well established methods of developing electrostatic images include cascade-, powder cloud-, magnetic brush- and fur-brushdevelopment. These methods are based on the application of charged dry toner to the surface bearing the electrostatic image. Other methods are based on the use of liquids, either insulating (electrophoretic development) or conductive liquids (see e.g. the United States Pat. No. 2,907,674 and the Belgian Pat. Nos. 610,060 and 625,335). Development of a conductivity image based on electrolysis is described e.g. by J.A. Amick, RCA Rev., 20, 753 (1959).

The following examples illustrate the present invention.

Example 1

An amount of 20 g of photoconductive zinc oxide, 25 ccs of water and 1 cc of a 10 percent solution of copoly(maleic anhydride/N-vinylpyrrolidone) (51.7/48.3) in a concentrated technical ammonia-water (1:9) solution is mixed for 10 minutes with a high speed stirrer such as a Kothoff mixer. The dispersion is then added to a solution of 2 g of poly(vinylacetate/crotonic acid) (94.4/5.6) and 1.25 ml of Cassurit-MLP (partially etherified melamine-formaldehyde resin marketed as a 80 percent aqueous solution by Cassella Farbwerke, Mainkur A.G., Frankfurt a/Main, W.Germany) in 25 ccs of water and 1 cc of a concentrated aqueous ammonia solution (25 percent by weight). The composition obtained is sensitized by one of the sensitizing agents mentioned in the following table. Each sensitizing dye is added in an amount of 0.5 mg per gram of zinc oxide in the form of a 0.1 percent solution and is intimately mixed with the ground composition.

Each sensitized composition is coated pro rata of 25 g of zinc oxide per sq.m on a baryta paper weighing 90 g/sq.m.

After having been dried, the obtained layers are charged, exposed for 15 sec. with an irradiation intensity of 2,280 lux by means of an incandescent lamp of 450 watt through a step wedge having a constant 0.1.

The differently sensitized layers are developed electrophoretically. The sensitivity of the obtained recording layers is expressed by the number of steps corresponding with the discharged areas on which no developing particles are deposited, which areas thus kept the original density of the recording layer. The higher this number, the more sensitive the layer.

TABLE 1

| Dyestuff of formula | Solution (1g/l) in | Sensitivity (number of non-blackened areas) | Sensitization maximum (nm) |
|---|---|---|---|
| – | – | 10 | – |
| 1 | DMF (*) | 18 | 490 |
| 2 | DMF | 15 | 670 |
| 3 | DMF | 17 | 545–684 |
| 4 | DMF | 16 | 685 |
| 5 | DMF | 15 | 555 |
| 6 | DMF | 15 | 775 |
| 7 | DMF | 17 | 755 |
| 8 | DMF | 13 | 670 |
| 9 | methanol | 13 | 588 |
| 10 | DMF | 14 | 587 |
| 11 | ethanol | 13 | 583 |
| 12 | DMF | 14 | 725 |
| 13 | DMF | 19 | 715 |
| 14 | DMF | 16 | 745 |
| 15 | ethanol | 17 | 668 |
| 16 | DMF | 22 | 660 |
| 17 | DMF | 24 | 670–765 |

(*) DMF = dimethylformamide

Example 2

2.4 kg of "ETHYL CELLULOSE N7" was dissolved in 80 liters of sym.-dichloroethane. "Ethyl Cellulose N7" is a trade name of an ethyl cellulose sold by Hercules Powder Company Inc., Wilmington, Delaware, U.S.A. A 5 percent by weight solution of this type of ethyl cellulose in a mixture of toluene and ethanol (80:20 parts by volume) possesses at 25° C a viscosity range of 6–8 cps and the degree of substitution of ethyl groups in this type of ethyl cellulose is 2.50 – 2.66.

The resulting solution was diluted with 3 liters of ethanol and 3 liters of cyclohexanone. Subsequently 60 kg of photoconductive zinc oxide prepared by oxidation of zinc oxide vapors were added while mixing. The whole dispersion was fed through a homogenizer whereupon the following compounds were added to the dispersion :

| | |
|---|---|
| sym.-dichloroethane | 170 ccs |
| ethanol | 37 ccs |
| 20 % solution of Vinnapas B 100/20 VL (trade namer for a copolymer of vinyl acetate and vinyl laurate (80/20) sold by Wacker Chemie G.m.b.H., Burghausen, W. Germany) in sym.-dichloroethane | 270 ccs |
| cyclohexanone | 155 ccs |
| 10 % solution of acid butyl phosphate in ethanol | 39 ccs |
| 10 % solution of tetrachlorophthalic anhydride in ethanol | 39 ccs |

The composition is then sensitized by one of the sensitizing agents mentioned in the table below. Each sensitizing agent is added in an amount of 0.5 mg per gram of zinc oxide in the form of a 0.1 percent solution.

The sensitized photoconductive compositions are coated pro rata of 33 g of solids per sq.m. on a glassine type paper base.

After having been dried, the layers obtained are further treated as described in example 1.

The results obtained are listed in table 2 below.

TABLE 2

| Dyestuff of formula | Solution (1g/l) in | Sensitivity | Sensitization maximum (nm) |
|---|---|---|---|
| – | – | 8 | – |
| 1 | methanol | 24 | 490 |
| 2 | methanol +H$_2$O | 14 | 670 |
| 4 | methanol | 12 | 685 |
| 5 | methanol | 12 | 555 |
| 7 | methanol | 13 | 755 |
| 8 | DMF | 13 | 670 |
| 10 | methanol | 14 | 590 |
| 11 | DMF | 15 | 585 |
| 12 | methanol | 18 | 725 |
| 13 | methanol | 14 | 715 |
| 15 | methanol | 24 | 670 |
| 16 | methanol | 24 | 660 |

We claim:

1. An inorganic photoconductive recording material comprising a photoconductive substance, the light-sensitivity of which is increased by a dye corresponding to one of the following general formulas I to IV :

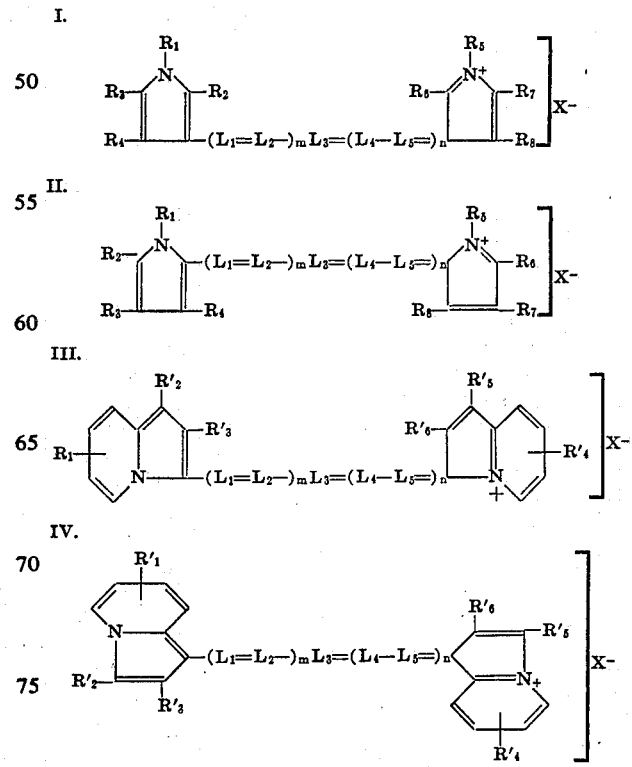

wherein:
each of $L_1$–$L_5$ (the same or different) stands for a methine group, an alkyl methine group or an aryl methine group,
each of $n$ and $m$ (the same or different) stands for 0 or 1,
each of $R_1$–$R_8$ (the same or different) stands for hydrogen, an alkyl group, allyl, a cycloalkyl group, an aralkyl group or an aryl group, or
$R_3$ together with $R_4$ and $R_7$ together with $R_8$ represent the atoms necessary to close a fused-on aromatic ring,
each of $R'_1$–$R'_6$ (the same or different) stands for hydrogen, an alkyl group, allyl, a cycloalkyl group, an aralkyl group or an aryl group, and
$X^-$ represents an anion, but $X^-$ is not present when the molecule itself contains an anionic group,
the dyestuffs corresponding to general formulas I and II containing in their molecule at least one sulphonic acid or carboxylic acid group in acid or salt form when in said formulas neither $R_1$ nor $R_5$ are hydrogen.

2. A photoconductive recording material according to claim 1, wherein the photoconductive substance is photoconductive zinc oxide.

3. A photoconductive recording material according to claim 2, containing a photoconductive layer comprising photoconductive zinc oxide dispersed in a binder.

4. An inorganic photoconductive recording material according to claim 1 wherein said dye corresponds to formula I.

5. An inorganic photoconductive recording material according to claim 1 wherein said dye corresponds to formula II.

6. An inorganic photoconductive recording material according to claim 1 wherein said dye corresponds to formula III.

7. An inorganic photoconductive recording material according to claim 1 wherein said dye corresponds to formula IV.

8. An inorganic photoconductive recording material according to claim 1 wherein said dye is

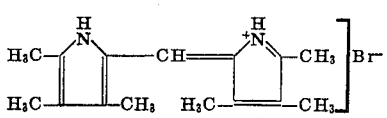

9. An inorganic photoconductive recording material according to claim 1 wherein said dye is

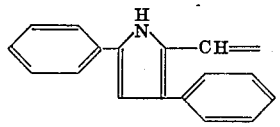

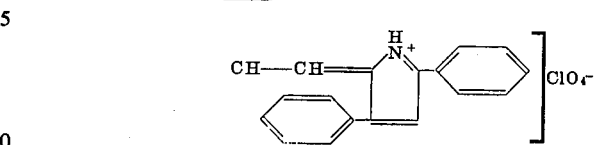

10. An inorganic photoconductive recording material according to claim 1 wherein said dye is

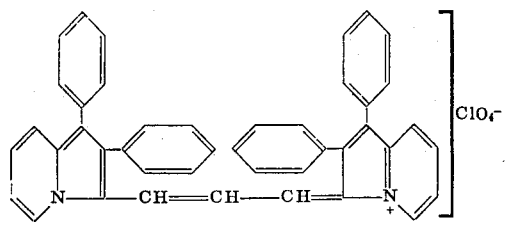

* * * * *